(12) United States Patent
Matsunami

(10) Patent No.: US 12,033,429 B2
(45) Date of Patent: Jul. 9, 2024

(54) IMAGE PROCESSING DEVICE OF DETERMINING AUTHENTICITY OF OBJECT, IMAGE PROCESSING METHOD OF DETERMINING AUTHENTICITY OF OBJECT, AND STORAGE MEDIUM STORING PROGRAM OF DETERMINING AUTHENTICITY OF OBJECT

(71) Applicant: FUJITSU LIMITED, Kawasaki (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 408 days.

(21) Appl. No.: 17/478,477

(22) Filed: Sep. 17, 2021

(65) Prior Publication Data

US 2022/0019771 A1    Jan. 20, 2022

Related U.S. Application Data

(63) Continuation of application No. PCT/JP2019/016869, filed on Apr. 19, 2019.

(51) Int. Cl.
*G06V 40/16* (2022.01)
*G06V 40/20* (2022.01)

(52) U.S. Cl.
CPC .......... *G06V 40/172* (2022.01); *G06V 40/165* (2022.01); *G06V 40/168* (2022.01); *G06V 40/20* (2022.01)

(58) Field of Classification Search
CPC .. G06V 40/172; G06V 40/165; G06V 40/168; G06V 40/20; G06V 40/16;
(Continued)

(56) References Cited

U.S. PATENT DOCUMENTS 8,542,879 B1 * 9/2013 Nechyba ............... G06V 40/171
  382/118
9,202,105 B1 * 12/2015 Wang ............... H04N 21/44008
(Continued)

FOREIGN PATENT DOCUMENTS

CN   106897658   6/2017
CN   109492550   3/2019
(Continued)

OTHER PUBLICATIONS

Japanese Office Action mailed Jul. 26, 2022 for corresponding Japanese Patent Application No. 2021-514780, with English Translation, 10 pages.
(Continued)

*Primary Examiner* — Kathleen Y Dulaney
(74) *Attorney, Agent, or Firm* — Fujitsu Intellectual Property Center

(57) ABSTRACT

An image processing device includes one or more memories; and one or more processors coupled to the one or more memories and the one or more processors configured to store, in the one or more memories, a plurality of time-series images that has captured an object when the object is instructed to change an orientation of a face, extract a face region from each of the plurality of time-series images, obtain characteristic of changes of pixel values of a plurality of pixels arranged in a certain direction in the face region, specify an action of the object based on a time-series change in the characteristic of changes obtained from each of the plurality of time-series images, and determine authenticity of the object based on the action of the object.

14 Claims, 10 Drawing Sheets

(58) Field of Classification Search
CPC ........ G06V 40/171; G06V 40/40; G06T 7/00; G06T 7/11; G06T 5/001; G06T 7/20; G06T 2207/30201
USPC .......................................................... 382/118
See application file for complete search history.

(56) References Cited

U.S. PATENT DOCUMENTS

| | | | |
|---|---|---|---|
| 9,619,723 B1* | 4/2017 | Chow | G06V 40/45 |
| 10,331,291 B1* | 6/2019 | Poder | G06F 21/36 |
| 10,360,464 B1* | 7/2019 | McKay | G06V 40/172 |
| 10,579,783 B1* | 3/2020 | Aument | G06V 40/40 |
| 10,764,281 B1* | 9/2020 | Gaeta | G06V 40/20 |
| 10,956,544 B1* | 3/2021 | Knas | G06V 40/172 |
| 2002/0176610 A1 | 11/2002 | Okazaki et al. | |
| 2006/0104504 A1* | 5/2006 | Sung | G06V 40/171 |
| | | | 382/118 |
| 2016/0057138 A1* | 2/2016 | Hoyos | G06V 40/168 |
| | | | 726/7 |
| 2016/0117544 A1* | 4/2016 | Hoyos | H04N 5/33 |
| | | | 348/78 |
| 2016/0277397 A1* | 9/2016 | Watanabe | H04L 63/0861 |
| 2016/0284123 A1* | 9/2016 | Hare | G06T 7/55 |
| 2016/0373437 A1* | 12/2016 | He | G06V 40/20 |
| 2016/0379042 A1* | 12/2016 | Bourlai | G06V 40/171 |
| | | | 382/118 |
| 2017/0118209 A1* | 4/2017 | Saravanan | G06F 18/22 |
| 2017/0169303 A1* | 6/2017 | Connell, II | G06V 40/165 |
| 2017/0289144 A1* | 10/2017 | Ionita | H04L 63/0861 |
| 2018/0032828 A1* | 2/2018 | Wang | G06V 40/166 |
| 2018/0060680 A1* | 3/2018 | Alon | G06F 21/32 |
| 2018/0096196 A1* | 4/2018 | Gordon | G06V 40/176 |
| 2018/0165508 A1* | 6/2018 | Othman | G06F 21/32 |
| 2018/0165832 A1* | 6/2018 | Nakayama | G06V 20/647 |
| 2019/0080189 A1* | 3/2019 | Van Os | H04N 23/611 |
| 2019/0092169 A1* | 3/2019 | Thurimella | B60K 35/10 |
| 2019/0147152 A1* | 5/2019 | Kurian | G06F 21/32 |
| | | | 382/118 |
| 2019/0180017 A1* | 6/2019 | Takashima | G06V 40/172 |
| 2019/0236342 A1* | 8/2019 | Madden | G08B 13/19602 |
| 2019/0238533 A1* | 8/2019 | Pointner | G06F 21/566 |
| 2020/0042685 A1* | 2/2020 | Tussy | H04L 63/0861 |
| 2020/0057846 A1* | 2/2020 | Gautam | G06V 40/171 |
| 2020/0134343 A1 | 4/2020 | Yamaoka et al. | |
| 2020/0143186 A1* | 5/2020 | Kato | G06F 21/32 |
| 2020/0272717 A1* | 8/2020 | Figueredo de Santana | G06V 40/172 |
| 2021/0049391 A1* | 2/2021 | Zou | G06T 7/62 |
| 2021/0397945 A1* | 12/2021 | Vahdat | G06N 3/047 |
| 2022/0036584 A1* | 2/2022 | Sun | G06T 7/75 |
| 2023/0343071 A1 | 10/2023 | Luo et al. | |

FOREIGN PATENT DOCUMENTS

| | | |
|---|---|---|
| JP | H11-339048 A | 12/1999 |
| JP | 2003-099763 A | 4/2003 |
| JP | 2003-150963 A | 5/2003 |
| JP | 2006-235718 A | 9/2006 |
| JP | 2008-071179 A | 3/2008 |
| JP | 2010-267257 A | 11/2010 |
| JP | 2015-041307 A | 3/2015 |
| JP | 2016-173813 A | 9/2016 |
| WO | 2019/017080 A1 | 1/2019 |

OTHER PUBLICATIONS

Motoo Yamamoto et al., "A Method of Anti-Imposter for Face Recognition Using User Interaction", Interaction Papers 2007, [online] Jul. 2, 2013 (Total 2 pages).
International Search Report and Written Opinion of the International Searching Authority (Form PCT/ISA/210, 220, and 237), mailed in connection with PCT/JP2019/016869and mailed Jul. 30, 2019 (Total 12 pages).
Japanese Office Action mailed Jan. 17, 2023 for corresponding Japanese Patent Application No. 2021-514780, with English Translation, 6 pages.
Extended European Search Report dated Mar. 17, 2022 for corresponding European Patent Application No. 19925334.5, 8 pages.
CNOA—Office Action of Chinese Patent Application No. 201980095279.7 dated Mar. 16, 2024, with English Translation.

* cited by examiner

IMAGE PROCESSING DEVICE OF DETERMINING AUTHENTICITY OF OBJECT, IMAGE PROCESSING METHOD OF DETERMINING AUTHENTICITY OF OBJECT, AND STORAGE MEDIUM STORING PROGRAM OF DETERMINING AUTHENTICITY OF OBJECT

CROSS-REFERENCE TO RELATED APPLICATION

This application is a continuation application of International Application PCT/JP2019/016869 filed on Apr. 19, 2019 and designated the U.S., the entire contents of which are incorporated herein by reference.

FIELD

The present invention relates to an image processing device, an image processing method, and a storage medium.

BACKGROUND

Biometric authentication techniques are techniques for performing personal authentication using biometric information of a person to be authenticated. The biometric authentication techniques include face authentication techniques, fingerprint authentication techniques, vein authentication techniques, voiceprint authentication techniques, and the like.

In the face authentication technique, biometric information obtained from a face image of the person to be authenticated is used when performing personal authentication. In this case, since another person can impersonate the person by receiving the personal authentication using a photograph of the person, spoofing attacks can be more easily performed than other biometric authentication techniques. To prevent the spoofing attacks, it is desirable to perform authenticity determination for determining whether the face image acquired from the person to be authenticated is a genuine face.

Regarding the authenticity determination for the face image, a technique of detecting a facial feature point indicating a position of a part of the face from the face image, and performing the authenticity determination using a movement of the facial feature point of when the person to be authenticated performs a predetermined action is known (see, for example, Patent Document 1 and Patent Document 2).

Patent Document 1: Japanese Laid-open Patent Publication No. 2008-71179, Patent Document 2: Japanese Laid-open Patent Publication No. 2003-99763.

SUMMARY

According to an aspect of the embodiments, an image processing device includes one or more memories; and one or more processors coupled to the one or more memories and the one or more processors configured to store, in the one or more memories, a plurality of time-series images that has captured an object when the object is instructed to change an orientation of a face, extract a face region from each of the plurality of time-series images, obtain characteristic of changes of pixel values of a plurality of pixels arranged in a certain direction in the face region, specify an action of the object based on a time-series change in the characteristic of changes obtained from each of the plurality of time-series images, and determine authenticity of the object based on the action of the object.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the existing authenticity determination based on the facial feature point, it is difficult to completely prevent the spoofing attacks using photographs, and correct determination results may not be obtained.

Note that such a problem occurs not only in the personal authentication using a face image but also in various types of information processing using a face image.

In one aspect, an object of the present invention is to determine authenticity of an object using an image that has captured the object.

According to one aspect, the authenticity of an object can be determined using an image that has captured the object.

Hereinafter, embodiments will be described in detail with reference to the drawings.

In the technique of Patent Document 1, the positions of eyes, mouth, and nose are used as the facial feature points, and at the time of registering a face image, the person to be registered is prompted to perform a predetermined facial action, and movement of the eyes, mouth, and nose at the time of the action is registered. Then, at the time of authentication, the person to be authenticated is prompted to perform the same action, and whether the face image is of the genuine face is determined from the movement of the eyes, mouth, and nose at the time of the action.

In the technique of Patent Document 2, the positions of eyes and nostrils are used as the facial feature points, and the person to be authenticated is prompted to perform an action of facing an arbitrary or predetermined direction, and whether the face image is of the genuine face is determined from the movement of the eyes and nostrils during the action.

However, in the existing authenticity determination based on the facial feature point, it is difficult to completely prevent the spoofing attacks using photographs, and correct determination results may not be obtained. For example, even when another person holds a photograph, the facial feature points can be detected from a captured image of the photograph, and the movement of the facial feature points can be reproduced by adding a change such as translation, rotation, or bending to the photograph.

Furthermore, the facial feature points are not always correctly detectable. For example, it is difficult to accurately detect one eye when the face is largely facing right or left, the nostril when the face is largely facing downward, and the like. Therefore, even if the person to be authenticated performs the action as instructed, the action may not be correctly determined.

Figure 1:
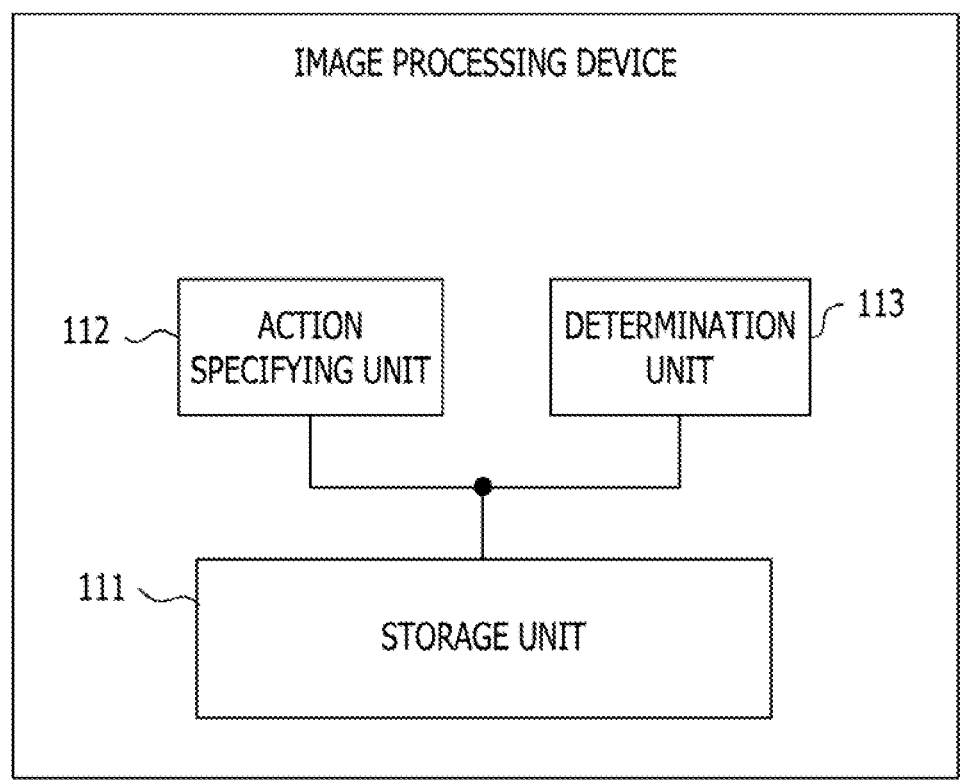
FIG. 1 is a functional configuration diagram of an image processing device.

FIG. 1 illustrates a functional configuration example of an image processing device according to an embodiment. An image processing device 101 of FIG. 1 includes a storage unit 111, an action specifying unit 112, and a determination unit 113. The storage unit 111 stores a plurality of time-series images that has captured an object when the object is instructed to change an orientation of the face. The action specifying unit 112 and the determination unit 113 perform image processing using the image stored in the storage unit 111.

Figure 2:
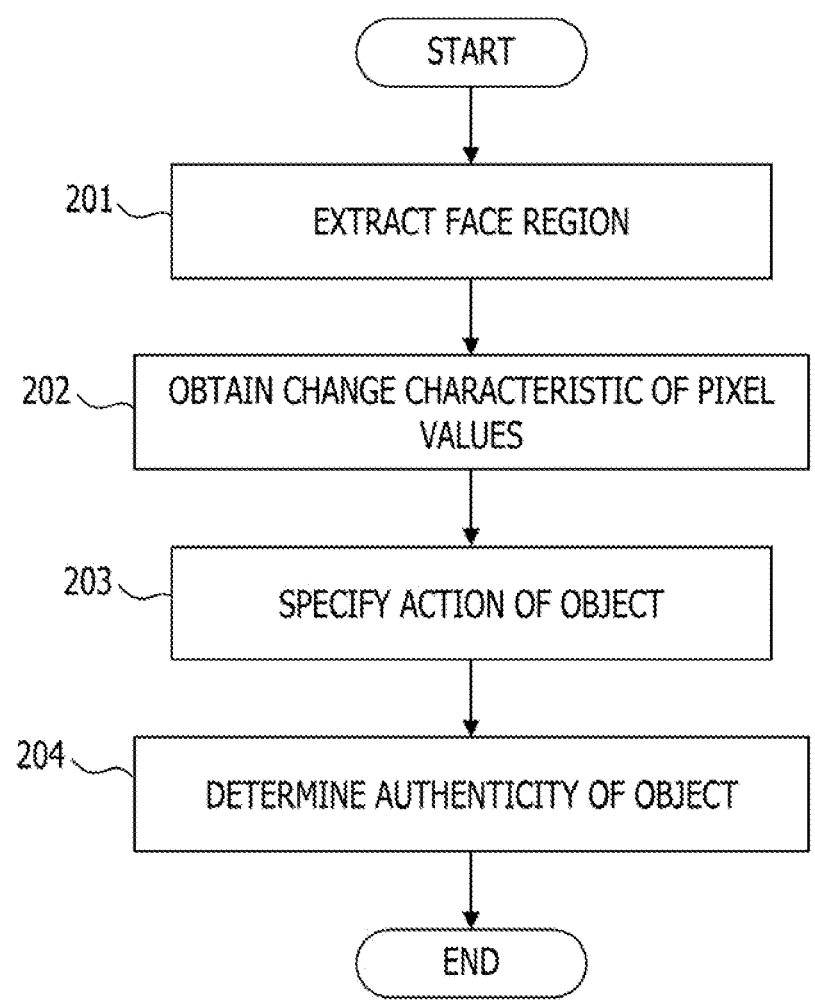
FIG. 2 is a flowchart of image processing.

FIG. 2 is a flowchart illustrating an example of the image processing performed by the image processing device 101 of FIG. 1. First, the action specifying unit 112 extracts a face region from each of the plurality of images (step 201).

Next, the action specifying unit 112 obtains a change characteristic of pixel values of a plurality of pixels arranged in a predetermined direction in the face region (step 202) and specifies an action of the object on the basis of a time-series change in the change characteristics obtained from each of the plurality of images (step 203).

Then, the determination unit 113 determines the authenticity of the object on the basis of the action of the object (step 204).

According to the image processing device 101 of FIG. 1, the authenticity of the object can be determined using an image that has captured the object.

Figure 3:
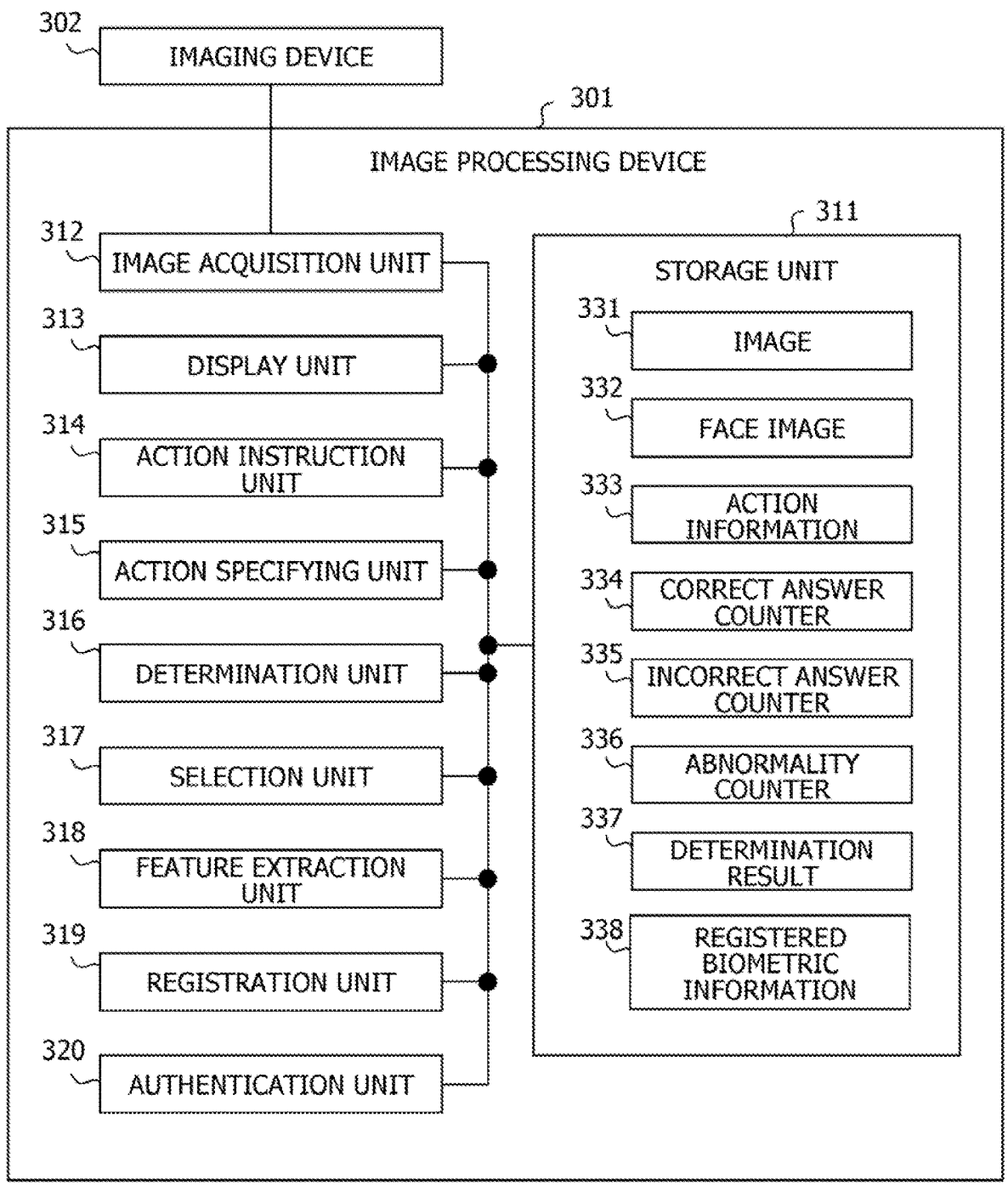
FIG. 3 is a functional configuration diagram illustrating a specific example of the image processing device.

FIG. 3 illustrates a functional configuration diagram illustrating a specific example of the image processing device 101 of FIG. 1. An image processing device 301 of FIG. 3 includes a storage unit 311, an image acquisition unit 312, a display unit 313, an action instruction unit 314, an action specifying unit 315, a determination unit 316, a selection unit 317, a feature extraction unit 318, a registration unit 319, and an authentication unit 320. The storage unit 311, the action specifying unit 315, and the determination unit 316 correspond to the storage unit 111, the action specifying unit 112, and the determination unit 113 of FIG. 1, respectively.

The imaging device 302 is a camera including an imaging element such as a charged-coupled device (CCD) or a complementary metal-oxide-semiconductor (CMOS), for example, and captures a video of the object. A video captured by the imaging device 302 includes a plurality of time-series images. The image at each time is sometimes called frame.

The image processing device 301 is, for example, a biometric authentication device, and performs biometric information processing based on an image of a person to be registered or a person to be authenticated. In the case where the biometric information processing is registration processing of registering biometric information of the person to be registered, the object is the person to be registered, and in the case where the biometric information processing is authentication processing of authenticating the person to be authenticated, the object is the person to be authenticated. Meanwhile, in the case where another person performs a spoofing attack using a photograph of the person, the object is the photograph of the person.

The action instruction unit 314 instructs the object to perform a specific action such as changing the orientation of the face in the registration processing or the authentication processing. The change of the orientation of the face includes an action of turning the face to the front with respect to the imaging device 302, an action of turning the face to the right or left, an action of turning the face upward or downward, and the like. The action instruction unit 314 can instruct the object to perform a specific action, using a text message, an illustration, a voice message, or the like.

The display unit 313 notifies the object of the instruction by displaying the text message or the illustration output from the action instruction unit 314 on a screen.

The imaging device 302 captures the face of the object while the object is performing the instructed action, and outputs a captured video to the image processing device 301. The image acquisition unit 312 acquires time-series N images 331 (N is an integer of 2 or more) from the video output by the imaging device 302 and stores the images 331 in the storage unit 311.

The action specifying unit 315 detects, from each image 331, the position of the face captured in the image 331, extracts a rectangular face region including the face, and generates a face image that is an image of the face region. N face images are generated from the N images 331. At this time, the action specifying unit 315 detects the positions of the right and left eyes and the nose from each image 331, and generates a face image such that the positions of the right and left eyes are horizontal and the position of the nose is located in the center of the face image.

Figure 4:
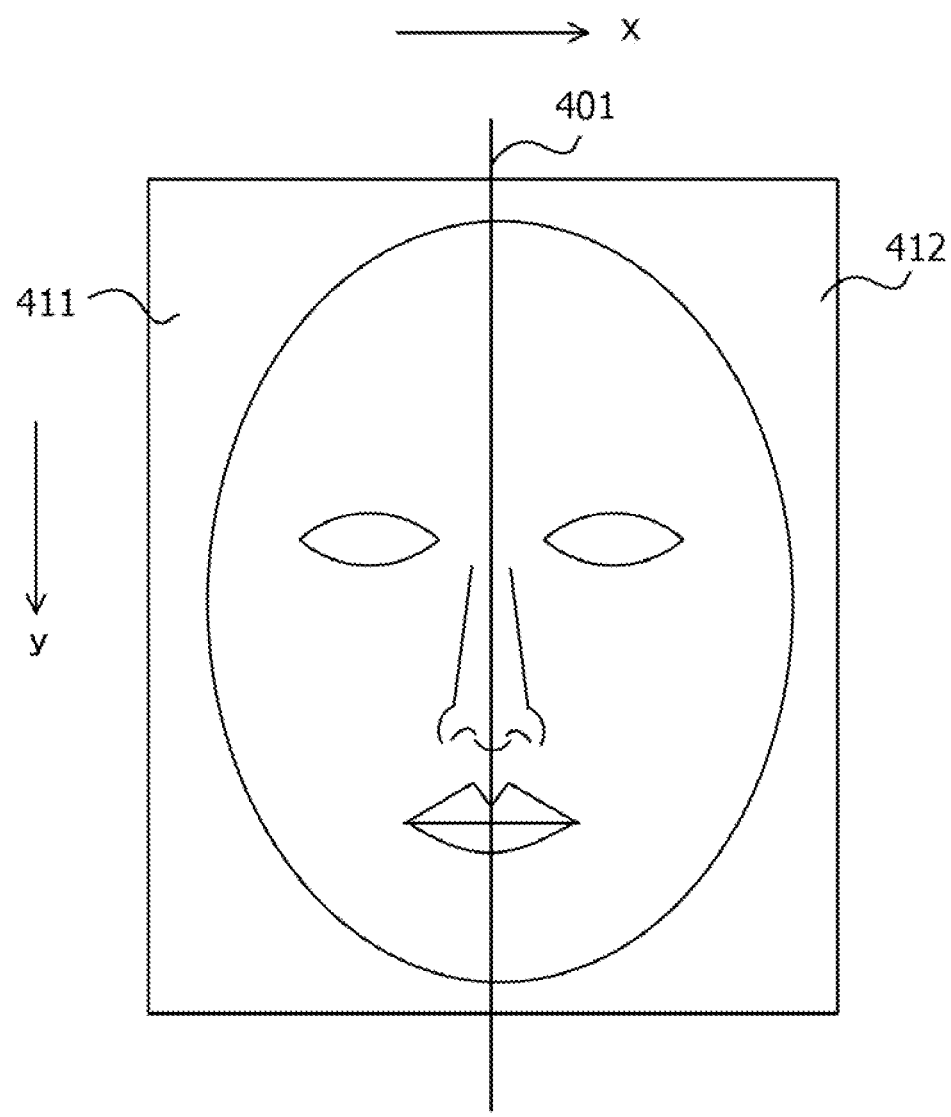
FIG. 4 is a diagram illustrating a face image.

FIG. 4 illustrates an example of the face image generated from the image 331. In the face image of FIG. 4, an x-axis and a y-axis are set as coordinate axes, and the x-axis represents the direction of a short side of the face image (horizontal direction) and the y-axis represents the direction of a long side of the face image (vertical direction). The direction of the short side is the right-left direction of the face, and the direction of the long side is an up-down direction of the face.

The nose is located on a center line 401 passing through a midpoint of the short side, and the right and left eyes are aligned on a straight line parallel to the short side. The face image is divided into a left-side region 411 and a right-side region 412 by the center line 401.

The action specifying unit 315 obtains a change characteristic of pixel values of a plurality of pixels arranged in the right-left direction in each of the N face images, and obtains a time-series change in the change characteristics of the pixel values obtained from the N face images. Furthermore, the action specifying unit 315 obtains an aspect ratio of each of the N face images, and obtains a time-series change in the aspect ratios obtained from the N face images.

Then, the action specifying unit 315 specifies the action of the object, using the time-series change in the change characteristics of the pixel values and the time-series change in the aspect ratios, generates action information 333 indicating the specified action, and stores the action information 333 in the storage unit 311. For example, the action information 333 indicates the action of turning the face to the front, the action of turning the face to the left, the action of turning the face to the right, the action of turning the face upward, the action of turning the face downward, or the like.

The determination unit 316 updates a correct answer counter 334 and an incorrect answer counter 335 using the action information 333, and also updates an abnormality counter 336 using the time-series change in the change characteristics of the pixel values and the time-series change in the aspect ratios.

The correct answer counter 334, the incorrect answer counter 335, and the abnormality counter 336 are used when the object is instructed to change the face orientation a plurality of times. The correct answer counter 334 indicates the number of times the action indicated by the action information 333 matches the action instructed to the object. The incorrect answer counter 335 indicates the number of times the action indicated by the action information 333 does not match the action instructed to the object.

Furthermore, the abnormality counter 336 indicates the number of times inappropriate movement of the object is detected. For example, an act of trying to reproduce the instructed action by another person holding a photograph of the person and changing the orientation of the photograph or deforming the photograph is detected as an inappropriate movement.

The determination unit 316 performs authenticity determination for the object, using count values indicated by the correct answer counter 334, the incorrect answer counter 335, and the abnormality counter 336. In the authenticity determination, whether the object is genuine, that is, whether the object is genuine or fake is determined.

For example, the determination unit 316 determines that the object is genuine in the case where the count value of the correct answer counter 334 is larger than a predetermined value, and determines that the object is fake in the case where the count value of the incorrect answer counter 335 is larger than a predetermined value. Then, the determination unit 316 stores a determination result 337 indicating whether the object is genuine or fake in the storage unit 311.

By instructing the object to change the orientation of the face a plurality of times and counting the number of times the object has performed the instructed action, the determination accuracy is improved compared to the case of performing the authenticity determination on the basis of one action.

In the case where the determination result 337 indicates the genuine face, the selection unit 317 selects an image to be processed from among N face images respectively generated from the N images 331. For example, as the image to be processed, a face image determined to have the face facing the front is selected.

The feature extraction unit 318 extracts feature information of the face captured in the image to be processed. For example, as the feature information of the face, position information indicating the position of each part of the face can be used. By using the face image having the face facing the front as the image to be processed, the feature information suitable for the registration processing and the authentication processing can be extracted.

In the registration processing, the registration unit 319 stores the extracted feature information in the storage unit 311 as registered biometric information 338 of the person to be registered. In the authentication processing, the authentication unit 320 authenticates the person to be authenticated by collating the extracted feature information with the registered biometric information 338.

It is difficult to reproduce the time-series change in the change characteristics of the pixel values in the face images and the time-series change in the aspect ratios of the face images even using a photograph or the like. Therefore, by performing the authenticity determination using such information, a genuine face and a fake face can be accurately identified, and robust and safe face authentication against spoofing attacks is implemented.

The action specifying unit 315 can use an image of a partial region of the face as the face image instead of an image of the entire face. The partial region of the face may be a region including a part from the eyes to the chin. By using the partial region of the face, an influence of the person or a part that greatly changes depending on shooting date and time, such as hair, can be reduced.

Furthermore, the action specifying unit 315 can apply predetermined image correction processing to the pixels of the face image and can obtain the change characteristic of the pixel values, using the face image to which the image correction processing has been applied. As the image correction processing, filter processing by a frequency filter, luminance correction processing by flattening a histogram, or the like is used. For example, by applying a blur filter (low-pass filter), the influence of minute parts such as moles can be reduced, and by applying the histogram flattening processing, the influence of a light source can be reduced.

Right-to-left symmetry of the pixel values can be used as the change characteristic of the pixel values in the right-left direction of the face image. The action specifying unit 315 calculates right-to-left symmetry Sym by, for example, the following equations.

[Math. 1]

$$Diff = \sum_{y=0}^{H} \sum_{x=0}^{W/2} \text{weight}(x) * \left( \frac{|I(x, y) - I(W - x + 1, y)|}{255} \right) \quad (1)$$

[Math. 2]

$$Sym = 1 - \frac{Diff}{H * \left(\frac{W}{2}\right)} \quad (2)$$

W represents a width of the face image and H represents a height of the face image. I (x, y) in Equation (1) represents a luminance value at coordinates (x, y) of the face image, and I (W−x+1, y) represents a luminance value at a position symmetrical to the coordinates (x, y) with respect to a bisector bisecting the face image to the right and left.

weight (x) is a weighting factor that depends on the coordinate x. The farther away from a center (x=W/2) of the face image, the more easily the luminance value is affected by parts with high right-to-left symmetry such as hair, so the weight (x) becomes larger as the x coordinate is closer to the center.

In this case, the Diff in Equation (1) presents a sum of adding information regarding a difference in the luminance values of two pixels existing at symmetrical positions with respect to the bisector of the face image for the entire face image. Sym of Equation (2) becomes larger as Diff is smaller, and becomes maximum in the case where the face image is completely symmetrical. The maximum value of Sym is 1 and the minimum value is 0. The action specifying unit 315 may calculate Diff, using RGB, a color difference signal, or the like of each pixel instead of the luminance value of each pixel.

A person's face has large right-to-left symmetry in the case of facing the front, and has small right-to-left symmetry in the case of facing the right or left. The right-to-left symmetry is maintained in the case where the face is facing up or down. Therefore, by instructing the object to change the orientation of the face in a predetermined order and calculating Sym from the face image while the object is performing the instructed action, the time-series change in the right-to-left symmetry can be obtained.

Figure 5A:
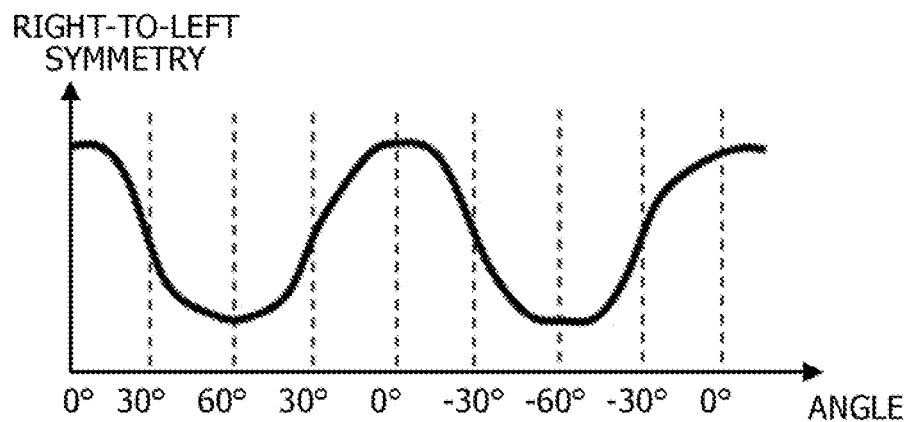
FIG. 5A, FIG. 5B and FIG. 5C are graphs illustrating time-series changes in right-to-left symmetry.
Figure 5B:
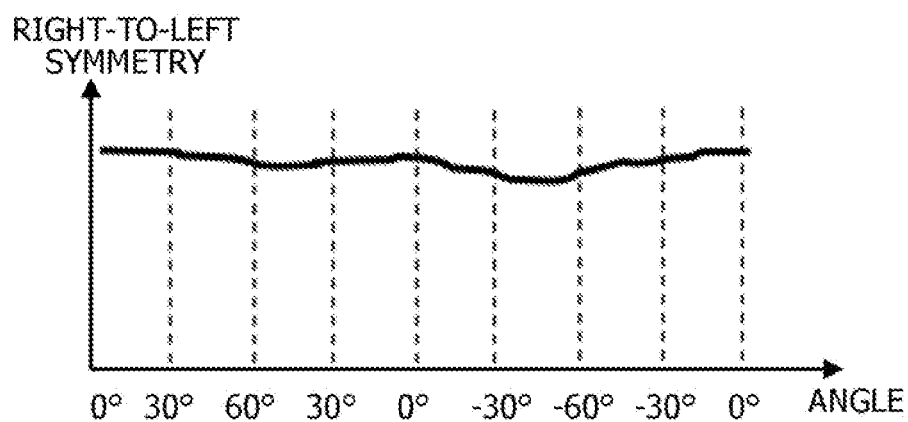
Figure 5C:
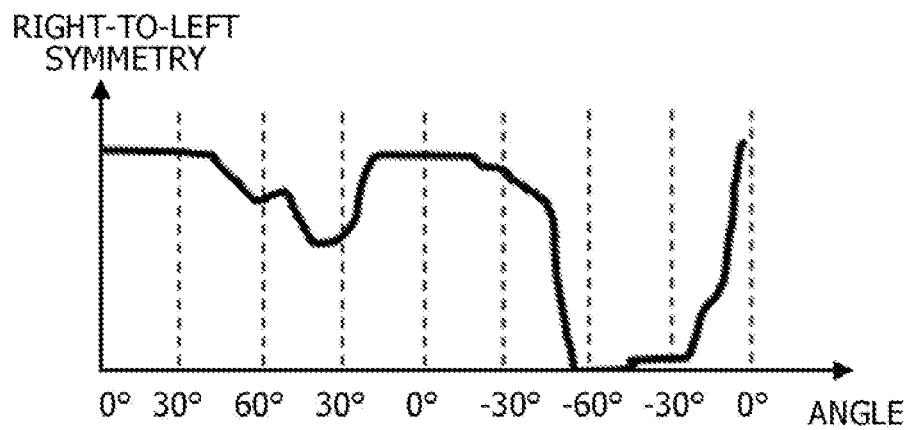

FIG. 5A, FIG. 5B and FIG. 5C illustrate examples of the time-series change in the right-to-left symmetry in the case where the object changes the orientation of the face in the order of front, left, front, right, and front. The horizontal axis represents an angle of the face in the right-left direction. 0° represents the front, positive values represent leftward when viewed from the object, and negative values represent rightward when viewed from the object. The vertical axis represents the right-to-left symmetry Sym.

FIG. 5A illustrates an example of the time-series change in the right-to-left symmetry in the case where the object is the genuine face. In this case, the time-series change appears as a smooth curve, and the larger the angle of facing the right or left, the smaller the right-to-left symmetry becomes.

FIG. 5B illustrates an example of the time-series change in right-to-left symmetry in the case where the object is a photograph and another person attempts to reproduce movement of the genuine face by rotating the photograph left and right. In this case, since the generated face image is an affine transformation of the original photograph, the right-to-left symmetry hardly changes.

FIG. 5C illustrates an example of the time-series change in the right-to-left symmetry in the case where the object is a photograph and another person applies a shape change such as bending when rotating the photograph. In this case, the right-to-left symmetry is reduced by adding the shape change to the photograph. However, since a sudden change occurs in the right-to-left symmetry in the shape change of the photograph that is a two-dimensional image, reproduction of a smooth curve as in FIG. 5A is difficult.

Therefore, the action specifying unit 315 determines that the object has performed the action of facing the right or left in the case of detecting the time-series change as in FIG. 5A. For example, the action specifying unit 315 can detect the time-series change in FIG. 5A by performing a frequency analysis for the time-series change in Sym.

Furthermore, the action specifying unit 315 can also detect the time-series change of FIG. 5A by recording a statistical value of Sym at each angle when a plurality of unspecified persons has performed the same action, and evaluating an error between the Sym calculated from the face image of the object and the statistical value. As the statistical value, an average value, a median value, a mode value, or the like is used.

In this way, by using the time-series change in the right-to-left symmetry of the pixel values, the state in which the object is facing the right or left can be detected. In the case where the state in which the object is facing the right or left is detected due to the decrease in the right-to-left symmetry, the action specifying unit 315 specifies which of the right or left the face is facing, using the following method, for example.

(A1) In the case where the nose in the face image is to the left of the center position of the right and left eyes, the action specifying unit 315 determines that the object's face is facing the right, whereas in the case where the nose is to the right of the center position of the right and left eyes, the action specifying unit 315 determines that the object's face is facing the left.

(A2) The action specifying unit 315 compares an average value LV of the luminance values in the left-side region of the face image with an average value RV of the luminance values in the right-side region of the face image. Then, the action specifying unit 315 determines that the face of the object is facing the right when LV is larger than RV, and determines that the face of the object is facing the left when RV is larger than LV.

The action specifying unit 315 may obtain a change characteristic of pixel values of a plurality of pixels arranged in a direction other than the right-left direction, such as in the up-down direction of each face image, and specify the action of the object, using the time-series change in the change characteristics.

The aspect ratio of the face image represents a ratio H/W of the height H to the width W of the face image, and can be obtained by dividing the height H by the width W. When the face is facing up or down, the width W of the face image is almost the same as the face image with the face facing the front, but the height H is smaller than the face image facing the front. Therefore, by instructing the object to change the orientation of the face in a predetermined order and calculating the aspect ratio from the face image while the object is performing the instructed action, the time-series change in the aspect ratios can be obtained.

Figure 6:
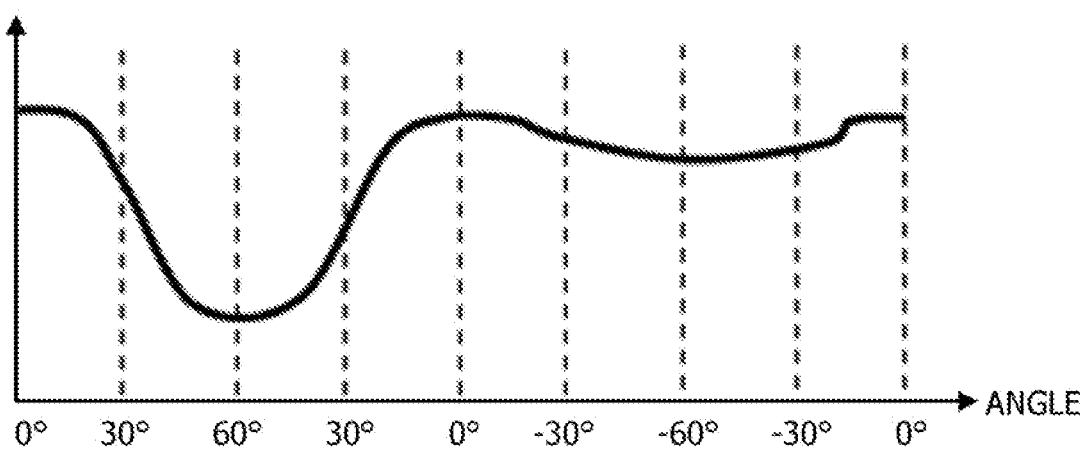
FIG. 6 is a graph illustrating a time-series change in aspect ratios.

FIG. 6 illustrates an example of the time-series change in the aspect ratios in the case where the object changes the orientation of the face in the order of front, up, front, down, and front. The horizontal axis represents an angle of the face in the up-down direction. 0° represents the front, positive values represent upward, and negative values represent downward. The vertical axis represents the aspect ratio.

For example, the action specifying unit 315 can detect the time-series change as in FIG. 6 by performing a frequency analysis for the time-series change in the aspect ratios. Furthermore, the action specifying unit 315 can also detect the time-series change of FIG. 6 by recording a statistical value of the aspect ratio at each angle when a plurality of unspecified persons has performed the same action, and evaluating an error between the aspect ratio calculated from the face image of the object and the statistical value. In this way, by using the time-series change in the aspect ratios of the face image, the state in which the object is facing up or down can be detected.

It is also possible to evaluate the right-to-left symmetry and the aspect ratio at each time, using the right-to-left symmetry and the aspect ratio when the face is facing the front as reference values. In this case, the action instruction unit 314 instructs the object to face the front, and the action specifying unit 315 determines that the face is facing the front in the case where the right-to-left symmetry falls within a predetermined range R1 and the aspect ratio falls within a predetermined range R2. Then, the right-to-left symmetry and the aspect ratio at that time are stored in the storage unit 311 as reference right-to-left symmetry and a reference aspect ratio, respectively.

For example, the action specifying unit 315 determines the predetermined range R1 by setting a tolerance to the right-to-left symmetry calculated from the face image of the person to be registered facing the front in the registration processing, or to the right-to-left symmetry calculated from the face images of a plurality of people facing the front. Furthermore, the action specifying unit 315 determines the predetermined range R2 by setting a tolerance to the aspect ratio calculated from the face image of the person to be registered facing the front in the registration processing, or to the aspect ratio calculated from the face images of a plurality of people facing the front.

Next, the action instruction unit 314 instructs the object to face left, right, up, or down. The action specifying unit 315 calculates a difference D1 between the right-to-left symmetry obtained from the face image and the reference right-toleft symmetry, and calculates a difference D2 between the aspect ratio obtained from the face image and the reference aspect ratio. Then, the action specifying unit 315 specifies which of the right or left the face is facing on the basis of the time-series change in the difference D1, and specifies which of up or down the face is facing on the basis of the time-series change in the difference D2.

The right-to-left symmetry and the aspect ratio when the face is facing the front are affected by an individual difference in the position of a part of the face, a shooting environment, or the like, but the influence is absorbed by using the difference D1 and the difference D2, and the orientation of the face can be accurately specified.

The action instruction unit 314 can record the number of instructions of instructing the object to perform an action and can perform the authenticity determination for the object on the basis of ratios of count values of the correct answer counter 334 and the incorrect answer counter 335 to the number of instructions. The ratio of the count value of the correct answer counter 334 to the number of instructions represents a correct answer rate, and the ratio of the count value of the incorrect answer counter 335 to the number of instructions represents an incorrect answer rate.

For example, the determination unit 316 determines that the object is genuine in the case where the correct answer rate is larger than a predetermined value. On the other hand, in the case where the correct answer rate is equal to or less than the predetermined value and the incorrect answer rate is larger than a predetermined value, the determination unit 316 determines that the object is fake.

The determination unit 316 can obtain sharpness of each of the N face images and also perform the authenticity determination of the object on the basis of a time-series change in the sharpness of those face images. The sharpness of an image represents the magnitude of unsharpness or blur of the image, and can be calculated using, for example, difference of gaussian (DOG) or the like. The smaller the unsharpness or blur, the greater the sharpness.

In the case where the object is genuine, the right-to-left symmetry, the aspect ratio, and the sharpness of the face image change smoothly in time-series, but in the case where improper movement is performed by a fake object, sudden changes are likely to occur, as illustrated in FIG. 5C.

Therefore, the determination unit 316 calculates the difference between the maximum value and the minimum value for each of the right-to-left symmetry, the aspect ratio, and the sharpness of the past M face images, and determines that inappropriate movement has been performed in the case where one of the differences is larger than a predetermined value. M may be an integer greater than or equal to 2 and less than or equal to N. Then, the determination unit 316 increments the abnormality counter 336, and determines that the object is fake in the case where the count value of the abnormality counter 336 exceeds a threshold value. In this way, inappropriate movement can be detected by using the time-series changes in the right-to-left symmetry aspect ratio, and sharpness of the face image.

On the other hand, in the case where there is almost no time-series change in the right-to-left symmetry, aspect ratio, and sharpness, there is a possibility that the object is stationary without following the instructions or no change appears due to a fake object. In such a case, it is not favorable to determine that the object is genuine.

Therefore, the determination unit 316 calculates the difference between the maximum value and the minimum value for each of the right-to-left symmetry, the aspect ratio, and the sharpness of the past M face images, and increments a stationary state detection counter in the case where all the differences are smaller than predetermined values. Then, in the case where the count value of the stationary state detection counter exceeds a threshold value, the determination unit 316 determines that the object is fake.

In the case where the determination result 337 indicates the genuine object, the selection unit 317 may select a face image having sharpness larger than a predetermined value as the image to be processed from among the face images determined that the face is facing the front.

Figure 7:
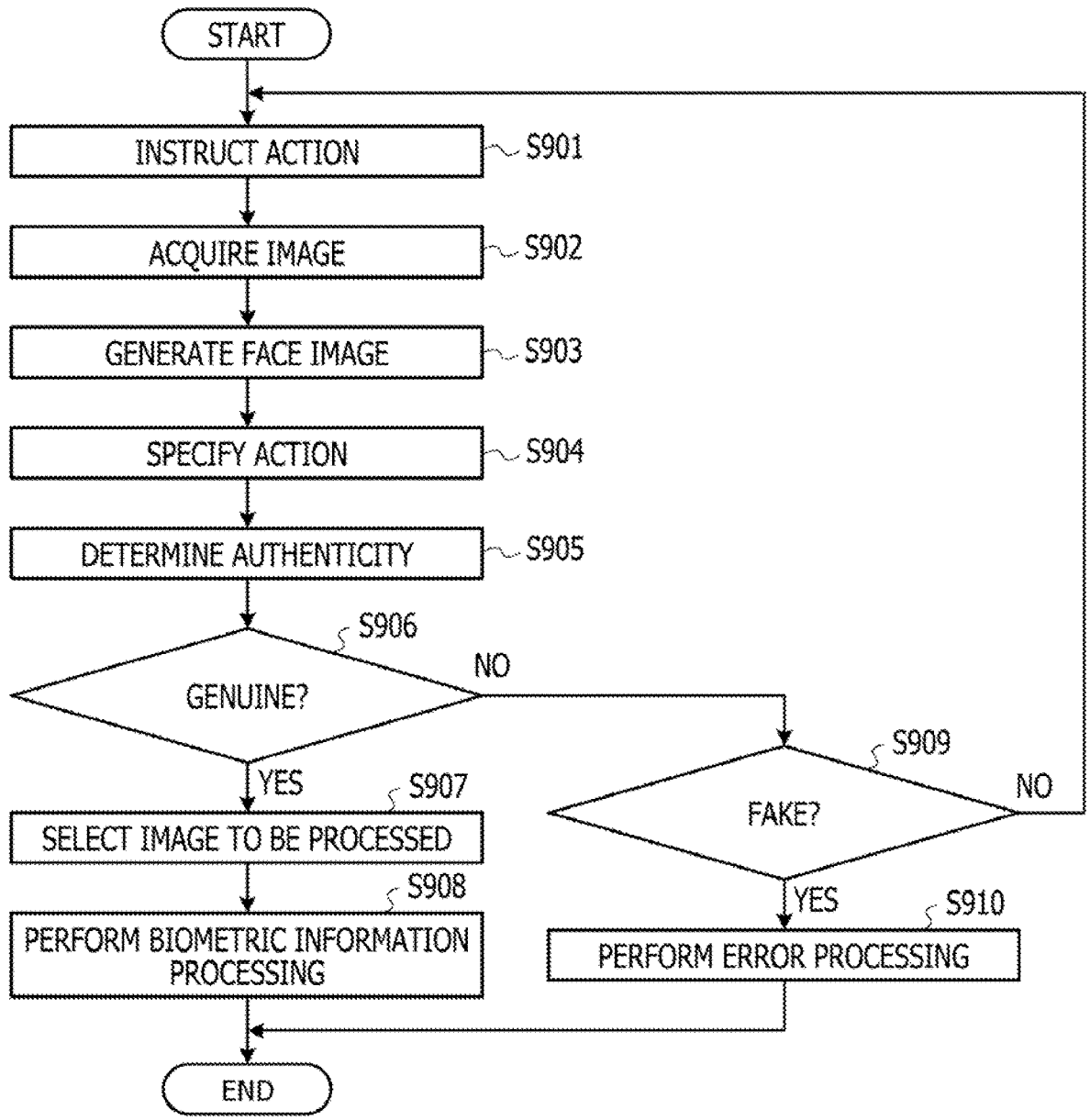
FIG. 7 is a flowchart illustrating a specific example of the image processing.

FIG. 7 is a flowchart illustrating a specific example of image processing performed by the image processing device 301 of FIG. 3. First, the action instruction unit 314 instructs the object to perform an action such as changing the orientation of the face (step 901), and the image acquisition unit 312 acquires the time-series N images 331 from the video output by the imaging device 302 (step 902).

Next, the action specifying unit 315 generates the face image from each of the N images 331 (step 903), specified the action of the object using a part or all of the N face images, and generates the action information 333 indicating the specified action (step 904).

Next, the determination unit 316 performs the authenticity determination using the action information 333 (step 905). The determination unit 316 generates the determination result 337 indicating that the object is genuine in the case where the object is genuine, and generates the determination result 337 indicating that the object is fake in the case where the object is fake. The determination result 337 is not generated in the case where whether the object is genuine or fake is unknown.

The selection unit 317 checks whether the determination result 337 indicates the genuine object (step 906) and selects the image to be processed from among the N face images (step 907) in the case where the determination result 337 indicates the genuine object (step 906, YES). Then, the feature extraction unit 318 extracts feature information of the face from the selected image to be processed.

Next, the registration unit 319 or the authentication unit 320 performs the biometric information processing (step 908). In the case where the biometric information processing is the registration processing, the registration unit 319 registers the extracted feature information in the storage unit 311 as the registered biometric information 338 of the object. In the case where the biometric information processing is the authentication processing, the authentication unit 320 authenticates the object by collating the extracted feature information with the registered biometric information 338.

In the case where the determination result 337 is not generated or the determination result 337 does not indicate the genuine object (step 906, NO), the action instruction unit 314 checks whether the determination result 337 indicates the fake object (step 909). In the case where the determination result 337 indicates the fake object (step 909, YES), the action instruction unit 314 performs error processing (step 910). In the error processing, the action instruction unit 314 generates error information indicating that the object is not genuine, and the display unit 313 displays the error information on the screen.

In the case where the determination result 337 is not generated (step 909, NO), the image processing device 301 repeats the processing of step 901 and the subsequent steps.

Figure 8:
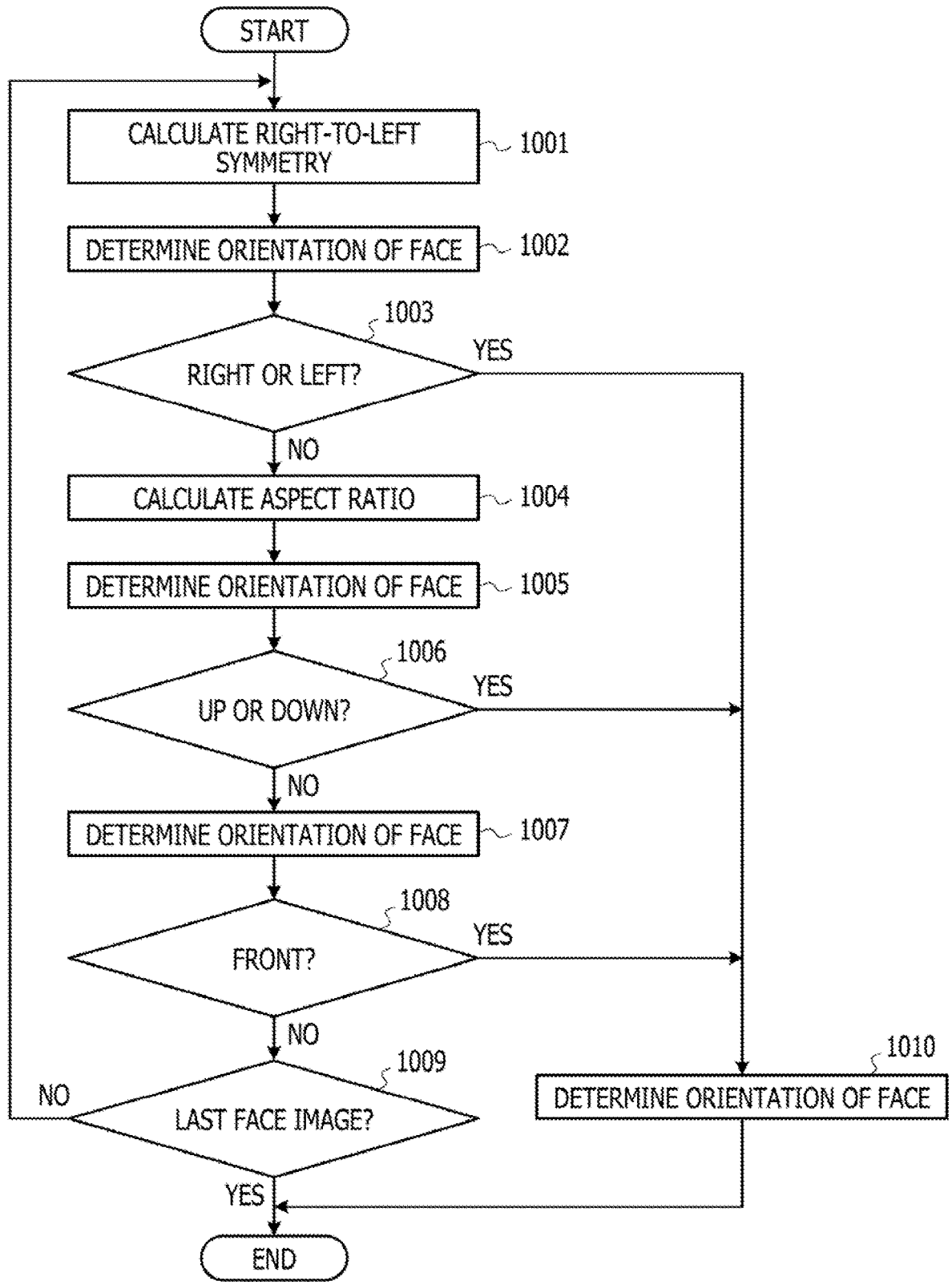
FIG. 8 is a flowchart of action specifying processing.

FIG. 8 is a flowchart illustrating an example of the action specifying processing in step 904 in FIG. 7. First, the action specifying unit 315 selects one face image from the N face images and calculates the right-to-left symmetry of the selected face image (step 1001). Then, the action specifying unit 315 determines the orientation of the face from the time-series change in the right-to-left symmetry (step 1002) and checks whether the face is facing the right or left (step 1003), In the case where the face is facing the right or left (step 1003, YES), the action specifying unit 315 generates the action information 333 indicating the action of turning the face to the right or left (step 1010).

In the case where the face is not facing the right or left (step 1003, NO), the action specifying unit 315 calculates the aspect ratio of the selected face image (step 1004). Then, the action specifying unit 315 determines the orientation of the face from the time-series change in the aspect ratios (step 1005) and checks whether the face is facing up or down (step 1006). In the case where the face is facing up or down (step 1006, YES), the action specifying unit 315 generates the action information 333 indicating the action of turning the face upward or downward (step 1010).

In the case where the face is not facing up or down (step 1006, NO), the action specifying unit 315 determines the orientation of the face from the time-series change in the right-to-left symmetry and the aspect ratios (step 1007) and checks whether the face is facing the front (step 1008). In the case where the face is facing the front (step 1008, YES), the action specifying unit 315 generates the action information 333 indicating the action of turning the face to the front (step 1010).

In the case where the face is not facing the front (step 1008, NO), the action specifying unit 315 checks whether the selected face image is the last face image (step 1009). In the case where an unprocessed face image remains (step 1009, NO), the action specifying unit 315 repeats the processing of step 1001 and the subsequent steps for the next face image. Then, in the case where the selected face image is the last face image (step 1009, YES), the action specifying unit 315 terminates the processing.

Figure 9:
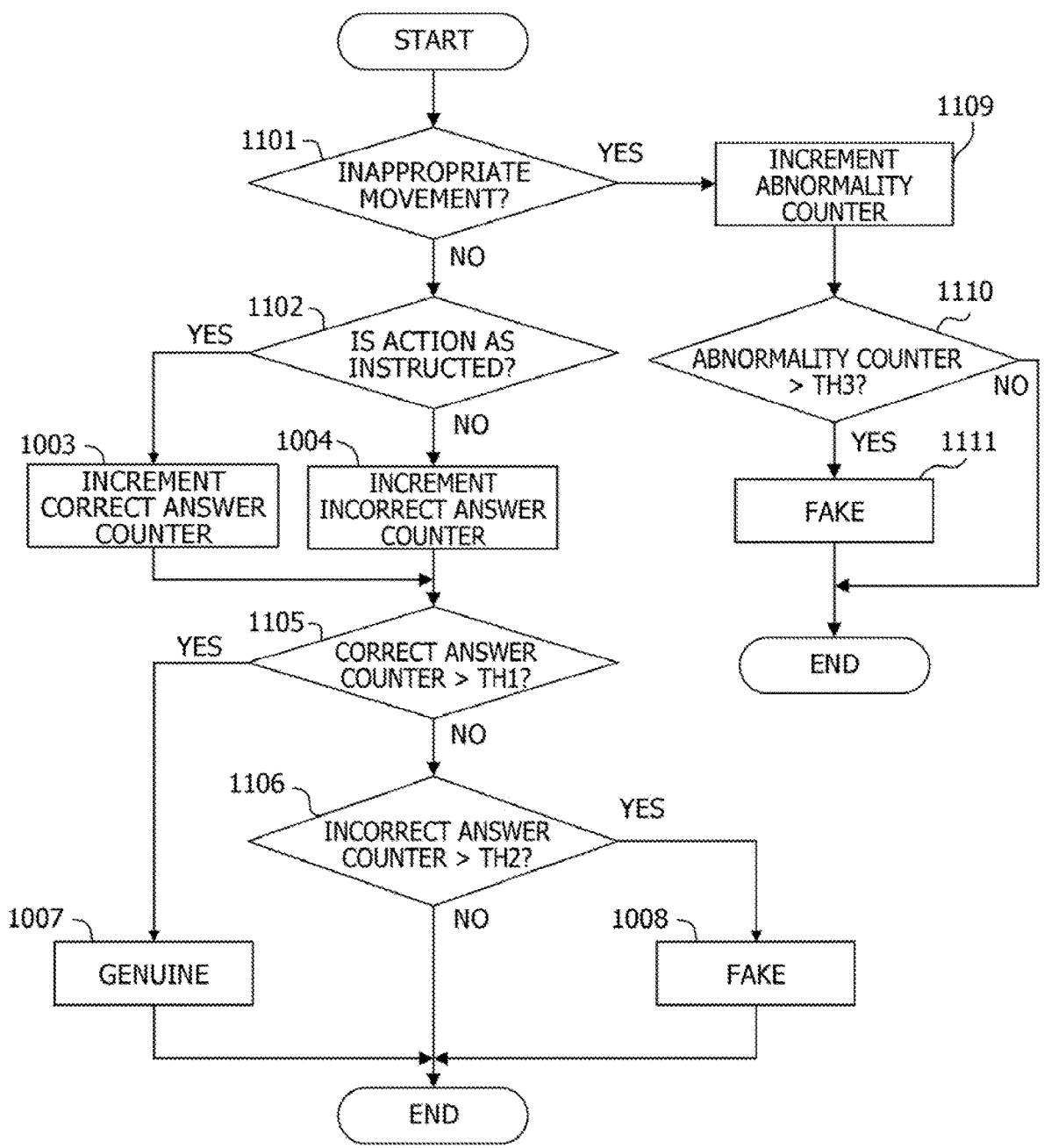
FIG. 9 is a flowchart of authenticity determination processing.

FIG. 9 is a flowchart illustrating an example of the authenticity determination processing in step 905 in FIG. 7. First, the determination unit 316 obtains the sharpness of each of the past M face images, and calculates the difference between the maximum value and the minimum value for each of the right-to-left symmetry, aspect ratio, and sharpness of those face images. Then, the determination unit 316 determines whether the object has performed inappropriate movement on the basis of the calculated differences (step 1101).

In the case where the object has not performed the inappropriate movement (step 1101, NO), the determination unit 316 checks whether the action of the object indicated by the action information 333 is as instructed by the action instruction unit 314 (step 1102), In the case where the action of the object is as instructed (step 1102, YES), the determination unit 316 increments the correct answer counter 334 by 1 (step 1103). On the other hand, in the case where the action of the object is not as instructed (step 1102, NO), the determination unit 316 increments the incorrect answer counter 335 by 1 (step 1104).

Next, the determination unit 316 compares the count value of the correct answer counter 334 with a threshold value TH1 (step 1105). In the case where the count value of the correct answer counter 334 is larger than TH1 (step 1105, YES), the determination unit 316 determines that the object is genuine and generates the determination result 337 indicating that the object is genuine (step 1107).

On the other hand, in the case where the count value of the correct answer counter 334 is TH1 or less (step 1105, NO), the determination unit 316 compares the count value of the incorrect answer counter 335 with a threshold value TH2 (step 1106). In the case where the count value of the incorrect answer counter 335 is larger than TH2 (step 1106, YES), the determination unit 316 determines that the object is fake and generates the determination result 337 indicating that the object is fake (step 1108).

On the other hand, in the case where the count value of the incorrect answer counter 335 is TH2 or less (step 1106, NO), the determination unit 316 terminates the processing.

In the case where the object has performed inappropriate movements (step 1101, YES), the determination unit 316 increments the abnormality counter 336 by 1 (step 1109) and compares the count value of the abnormality counter 336 with a threshold value TH3 (step 1110). In the case where the count value of the abnormality counter 336 is larger than TH3 (step 1110, YES), the determination unit 316 determines that the object is fake and generates the determination result 337 indicating that the object is fake (step 1111).

On the other hand, in the case where the count value of the abnormality counter 336 is TH3 or less (step 1110, NO), the determination unit 316 terminates the processing.

Note that, in the authenticity determination processing, it is also possible to provide a time-out time for the action of the object. In this case, the determination unit 316 determines that the object is fake in the case where the action of the object matching the instructed change of the orientation of the face is not specified from the image 331 captured within a predetermined time after the action instruction unit 314 instructs the object to change the orientation of the face.

By setting the time-out time for the action of the object, the error processing is performed in the case where the object does not follow the instruction, and the registration of the registered biometric information 338 or the authentication for the object can be refused.

The configurations of the image processing device 101 of FIG. 1 and the image processing device 301 of FIG. 3 are merely examples and some configuration elements may be omitted or modified according to the use or conditions of the image processing device. For example, in the image processing device 301 of FIG. 3, in the case where time-series N images 331 are stored in the storage unit 311 in advance, the image acquisition unit 312, the display unit 313, and the action instruction unit 314 can be omitted.

In the case where the biometric information processing is performed by an external device, the selection unit 317, the feature extraction unit 318, the registration unit 319, and the authentication unit 320 can be omitted. The image processing device 301 may perform another information processing using the face image instead of performing the biometric information processing using the face image.

The flowcharts illustrated in FIGS. 2 and 7 to 9 are merely examples and some processes may be omitted or modified according to the configuration or conditions of the image processing device. For example, in the image processing of FIG. 7, in the case where time-series N images 331 are stored in the storage unit 311 in advance, the processing of steps 901 and 902 can be omitted.

In the case where the biometric information processing is performed by an external device, the processing of steps 907 and 908 can be omitted. In step 908, the image processing device 301 may perform another information processing instead of the biometric information processing.

In the action specifying processing of FIG. 8, in the case where the action of the object is specified only based on the right-to-left symmetry of the face image, the processing of steps 1004 to 1006 can be omitted.

In the authenticity determination processing of FIG. 9, in the case where the inappropriate movement of the object is not used for the authenticity determination, the processing of step 1101 and steps 1109 to 1111 can be omitted. In the case where the number of times the object does not perform the instructed action is not used for the authenticity determination, the processing of step 1104, step 1106, and step 1108 can be omitted.

The face image in FIG. 4, the time-series change in the right-to-left symmetry in FIG. 5A, FIG. 5B and FIG. 5C, and the time-series change in the aspect ratio in FIG. 6 are only examples, and the face image and the time-series change in the right-to-left symmetry and the aspect ratio changes according to the object. Equations (1) and (2) are merely examples, and the right-to-left symmetry of the face image may be calculated using other calculation equations.

Figure 10:
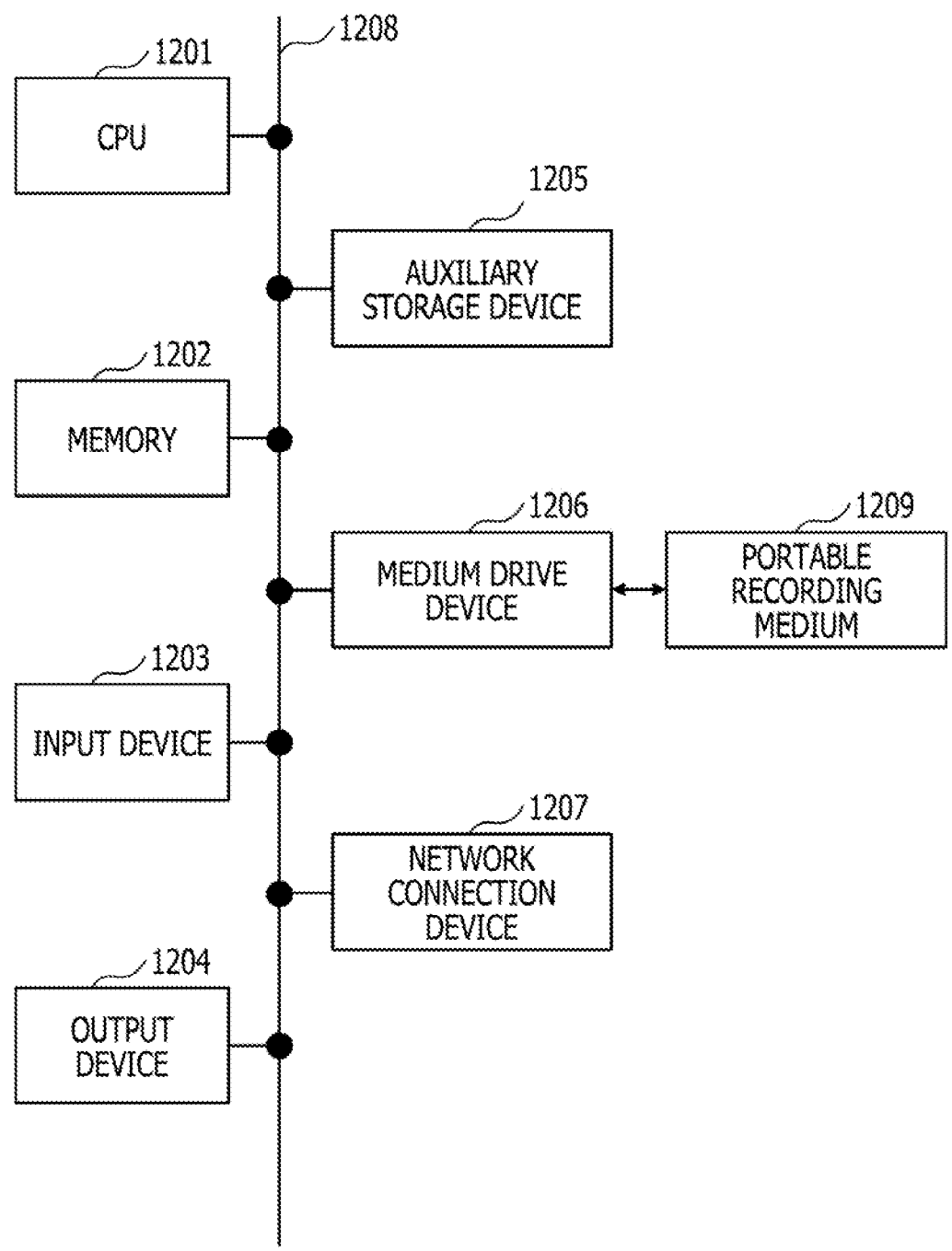
FIG. 10 is a configuration diagram of an information processing device.

FIG. 10 illustrates a configuration example of an information processing device (computer) used as the image processing device 101 in FIG. 1 and the image processing device 301 of FIG. 3. The information processing device in FIG. 10 includes a central processing unit (CPU) 1201, a memory 1202, an input device 1203, an output device 1204, an auxiliary storage device 1205, a medium drive device 1206, and a network connection device 1207. These configuration elements are connected to one another by a bus 1208. The imaging device 302 in FIG. 3 may be connected to the bus 1208.

The memory 1202 is, for example, a semiconductor memory such as a read only memory (ROM), a random access memory (RAM), or a flash memory, and stores programs and data to be used for the process. The memory 1202 can be used as the storage unit 111 of FIG. 1 or the storage unit 311 of FIG. 3.

The CPU 1201 (processor) operates as the action specifying unit 112 and the determination unit 113 of FIG. 1 by executing a program using the memory 1202, for example. The CPU 1201 executes the program using the memory 1202 to operate as an image acquisition unit 312, an action instruction unit 314, an action specifying unit 315, a determination unit 316, a selection unit 317, a feature extraction unit 318, a registration unit 319, and an authentication unit 320 of FIG. 3.

The input device 1203 is, for example, a keyboard, a pointing device, or the like and is used for inputting an instruction or information from an operator or a user. The output device 1204 is, for example, a display device, a printer, a speaker, or the like and is used for an inquiry or an instruction to the operator or the user, and outputting a processing result. The instruction to the operator or the user may be an action instruction to the object, and the processing result may be the determination result 337. The output device 1204 can be used as the display unit 313 in FIG. 3.

The auxiliary storage device 1205 is, for example, a magnetic disk device, an optical disk device, a magneto-optical disk device, a tape device, or the like. The auxiliary storage device 1205 may be a hard disk drive or a flash memory. The information processing device can save programs and data in the auxiliary storage device 1205 and load these programs and data into the memory 1202 to use. The auxiliary storage device 1205 can be used as the storage unit 111 of FIG. 1 or the storage unit 311 of FIG. 3.

The medium drive device 1206 drives a portable recording medium 1209 and accesses recorded content of the portable recording medium 1209. The portable recording medium 1209 is a memory device, a flexible disk, an optical disk, a magneto-optical disk, or the like. The portable recording medium 1209 may be a compact disk read only memory (CD-ROM), a digital versatile disk (DVD), a universal serial bus (USB) memory, or the like. The operator or the user can store programs and data in the portable recording medium 1209 and load these programs and data into the memory 1202 to use.

As described above, a computer-readable recording medium in which the programs and data used for processing are stored includes a physical (non-transitory) recording medium such as the memory 1202, the auxiliary storage device 1205, and the portable recording medium 1209.

The network connection device 1207 is a communication interface circuit that is connected to a communication network such as a local area network (LAN) and a wide area network (WAN), and that performs data conversion pertaining to communication. The information processing device can receive programs and data from an external device via the network connection device 1207 and load these programs and data into the memory 1202 to use.

Note that the information processing device does not need to include all the configuration elements in FIG. 10, and some configuration elements may be omitted depending on the use or the condition. For example, in a case where an interface with the operator or the user is not needed, the input device 1203 and the output device 1204 may be omitted. In a case where the portable recording medium 1209 or the communication network is not used, the medium drive device 1206 or the network connection device 1207 may be omitted.

While the disclosed embodiments and the advantages thereof have been described in detail, those skilled in the art will be able to make various modifications, additions, and omissions without departing from the scope of the embodiments as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing device comprising:
    one or more memories; and
    one or more processors coupled to the one or more memories and the one or more processors configured to:
        store, in the one or more memories, a plurality of time-series images that has captured an object when the object is instructed to change an orientation of a face,
        extract a face region from each of the plurality of time-series images,
        obtain characteristic of changes of pixel values of a plurality of pixels arranged in a certain direction in the face region,
        specify an action of the object based on a time-series change in the characteristic of changes obtained from each of the plurality of time-series images, and
        determine authenticity of the object based on the action of the object, wherein
    the change of the orientation of the face instructed to the object represents turning the face to the right or left, the certain direction is a right-left direction of the face,
the characteristic of changes of pixel values of the plurality of pixels arranged in the certain direction represents right-to-left symmetry of the pixel values of the plurality of pixels, and
the action of the object is turning the face to right or left, wherein the one or more processors is further configured to:
obtain an aspect ratio of the face region,
when the right-to-left symmetry is within a certain range and the aspect ratio is within a certain range, determine that the face is facing the front with respect to an imaging device that has captured the object,
store, in the one or more memories, the right-to-left symmetry and the aspect ratio when determined that the face is facing the front with respect to the imaging device as reference right-to-left symmetry and a reference aspect ratio, and
specify which of right or left the face is facing based on a time-series change in a difference between right-to-left symmetry obtained after the reference right-to-left symmetry and the reference aspect ratio are stored in the one or more memories, and the reference right-to-left symmetry.

2. The image processing device according to claim 1, wherein the one or more processors is further configured to:
apply image correction processing to pixels in the face region, and
obtain the characteristic of changes of pixel values of the plurality of pixels from the face region to which the image correction processing is applied.

3. The image processing device according to claim 1, wherein the one or more processors is further configured to:
specify the action of the object based on a time-series change in aspect rations of the face region obtained from each of the plurality of time-series images.

4. The image processing device according to claim 1, wherein the one or more processors is further configured to
specify which of up or down the face is facing based on a time-series change in a difference between an aspect ratio obtained after the reference right-to-left symmetry and the reference aspect ratio are stored in the one or more memories, and the reference aspect ratio.

5. The image processing device according to claim 1, wherein the one or more processors is further configured to
select an image of the face region in which the face is determined to be facing the front from among the face regions respectively extracted from the plurality of time-series images, as a face image to be registered or authenticated.

6. The image processing device according to claim 1, wherein the one or more processors is further configured to
determine that the object is genuine when the change of the orientation of the face has been instructed to the object a plurality of times, and a number of times that the specified action of the object matches the change of the orientation of the face instructed to the object is larger than a certain value.

7. The image processing device according to claim 1, wherein the one or more processors is further configured to
determine that the object is not genuine when the action matching the change of the orientation of the face is not specified from an image captured within a certain time after the change of the orientation of the face is instructed to the object.

8. The image processing device according to claim 1, wherein the one or more processors is further configured to:
obtain sharpness of the face region, and
determine authenticity of the object based on a time-series change in the sharpness obtained from each of the plurality of time-series images.

9. An image processing method for a computer to execute a process comprising:
storing, in the one or more memories, a plurality of time-series images that has captured an object when the object is instructed to change an orientation of a face;
extracting a face region from each of the plurality of time-series images;
obtaining characteristic of changes of pixel values of a plurality of pixels arranged in a certain direction in the face region;
specifying an action of the object based on a time-series change in the characteristic of changes obtained from each of the plurality of time-series images; and
determining authenticity of the object based on the action of the object, wherein
the change of the orientation of the face instructed to the object represents turning the face to the right or left,
the certain direction is a right-left direction of the face,
the characteristic of changes of pixel values of the plurality of pixels arranged in the certain direction represents right-to-left symmetry of the pixel values of the plurality of pixels, and
the action of the object is turning the face to right or left, wherein the process further comprises:
obtaining an aspect ratio of the face region
when the right-to-left symmetry is within a certain range and the aspect ratio is within a certain range, determining that the face is facing the front with respect to an imaging device that has captured the object,
storing, in the one or more memories, the right-to-left symmetry and the aspect ratio when determined that the face is facing the front with respect to the imaging device as reference right-to-left symmetry and a reference aspect ratio, and
specifying which of right or left the face is facing based on a time-series change in a difference between right-to-left symmetry obtained after the reference right-to-left symmetry and the reference aspect ratio are stored in the one or more memories, and the reference right-to-left symmetry.

10. The image processing method according to claim 8 wherein the process further comprising
specifying which of up or down the face is facing based on a time-series change in a difference between an aspect ratio obtained after the reference right-to-left symmetry and the reference aspect ratio are stored in the one or more memories, and the reference aspect ratio.

11. The image processing method according to claim 9, wherein the process further comprising
determining that the object is genuine when the change of the orientation of the face has been instructed to the object a plurality of times, and a number of times that the specified action of the object matches the change of the orientation of the face instructed to the object is larger than a certain value.

12. A non-transitory computer-readable storage medium storing an image processing program that causes at least one computer to execute a process, the process comprising:
storing, in the one or more memories, a plurality of time-series images that has captured an object when the object is instructed to change an orientation of a face, extracting a face region from each of the plurality of time-series images, obtaining characteristic of changes of pixel values of a plurality of pixels arranged in a certain direction in the face region, specifying an action of the object based on a time-series change in the characteristic of changes obtained from each of the plurality of time-series images, and determining authenticity of the object based on the action of the object, wherein the change of the orientation of the face instructed to the object represents turning the face to the right or left, the certain direction is a right-left direction of the face, the characteristic of changes of pixel values of the plurality of pixels arranged in the certain direction represents right-to-left symmetry of the pixel values of the plurality of pixels, and the action of the object is turning the face to right or left, wherein the process further comprises:

obtaining an aspect ratio of the face region, when the right-to-left symmetry is within a certain range and the aspect ratio is within a certain range, determining that the face is facing the front with respect to an imaging device that has captured the object, storing, in the one or more memories, the right-to-left symmetry and the aspect ratio when determined that the face is facing the front with respect to the imaging device as reference right-to-left symmetry and a reference aspect ratio, and specifying which of right or left the face is facing based on a time-series change in a difference between right-to-left symmetry obtained after the reference right-to-left symmetry and the reference aspect ratio are stored in the one or more memories, and the reference right-to-left symmetry.

13. The non-transitory computer-readable storage medium according to claim 12, wherein the process further comprising specifying which of up or down the face is facing based on a time-series change in a difference between an aspect ratio obtained after the reference right-to-left symmetry and the reference aspect ratio are stored in the one or more memories, and the reference aspect ratio.

14. The non-transitory computer-readable storage medium according to claim 12, wherein the process further comprising determining that the object is genuine when the change of the orientation of the face has been instructed to the object a plurality of times, and a number of times that the specified action of the object matches the change of the orientation of the face instructed to the object is larger than a certain value.

* * * * *